United States Patent
Liu et al.

(10) Patent No.: US 11,030,718 B1
(45) Date of Patent: Jun. 8, 2021

(54) IMAGE STITCHING METHOD AND RELATED MONITORING CAMERA APPARATUS

(71) Applicant: VIVOTEK INC., New Taipei (TW)

(72) Inventors: Cheng-Chieh Liu, New Taipei (TW); Hui-Chih Wang, New Taipei (TW); Chang-Li Chen, New Taipei (TW); Chao-Tan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 16/703,885

(22) Filed: Dec. 5, 2019

(51) Int. Cl.
*G06T 3/40* (2006.01)
*G06T 7/33* (2017.01)
*H04N 7/18* (2006.01)

(52) U.S. Cl.
CPC ............ *G06T 3/4038* (2013.01); *G06T 7/337* (2017.01); *H04N 7/18* (2013.01); *G06T 2207/20221* (2013.01)

(58) Field of Classification Search
CPC ................... G06T 3/4038; G06T 7/337; G06T 2207/20221; H04N 7/18
USPC ........................................................ 348/143
See application file for complete search history.

(56) References Cited

U.S. PATENT DOCUMENTS

| | | | | |
|---|---|---|---|---|
| 7,460,730 B2* | 12/2008 | Pal | ............................ | G06K 9/32 382/284 |
| 8,385,689 B2* | 2/2013 | Chandrashekar | ......... | G06T 7/35 382/294 |
| 2008/0298718 A1* | 12/2008 | Liu | ............................ | G06T 7/33 382/284 |
| 2011/0064327 A1* | 3/2011 | Dagher | .................... | G06T 5/004 382/263 |
| 2011/0091065 A1* | 4/2011 | Chandrashekar | ........ | G06T 7/337 382/100 |
| 2014/0219581 A1* | 8/2014 | Astrand | ................... | G06T 11/60 382/284 |
| 2016/0012594 A1* | 1/2016 | Romanik | ................. | G06T 7/337 382/203 |
| 2016/0307350 A1* | 10/2016 | Huang | ................... | G06K 9/4671 |
| 2017/0148138 A1* | 5/2017 | Liu | ............................ | G06T 7/33 |
| 2018/0253875 A1* | 9/2018 | Gorur Sheshagiri | ........................ | G06T 3/0081 |
| 2019/0114795 A1* | 4/2019 | Rajvanshi | ................. | G06T 7/55 |

(Continued)

OTHER PUBLICATIONS

Ha, et al., Evaluation of Feature Based Image Stitching Algorithm using OpenCV, Jan. 2017, IEEE Xplore 978-1-5090-4688, pp. 224-229.*

*Primary Examiner* — Marnie A Matt
(74) *Attorney, Agent, or Firm* — Winston Hsu (57) ABSTRACT

An image stitching method applied to a monitoring camera apparatus with a first image receiver and a second image receiver for acquiring a first image and a second image. The image stitching method includes detecting a plurality of first features in the first image and a plurality of second features in the second image, dividing the plurality of first features at least into a first group and a second group and further dividing the plurality of second features at least into a third group, analyzing the plurality of first features and the plurality of second features via an identification condition to determine whether one of the first group and the second group is matched with the third group, and utilizing two matched groups to stitching the first image and the second image.

19 Claims, 9 Drawing Sheets

(56) References Cited

U.S. PATENT DOCUMENTS

2019/0197313 A1\* 6/2019 Iwanaga ................. G06T 7/194

\* cited by examiner

IMAGE STITCHING METHOD AND RELATED MONITORING CAMERA APPARATUS

BACKGROUND OF THE INVENTION

1. Field of the Invention

The present invention relates to an image stitching method and a monitoring camera apparatus, and more particularly, to an image stitching method utilizing a feature without an identification pattern to increase a detecting distance and systemic adaptability and a related monitoring camera apparatus.

2. Description of the Prior Art

If a monitoring camera is applied for capturing a large-range monitor image, several camera units are arranged in different angles to face a monitoring region of the monitoring camera. A field of view of one camera unit is different from a field of view of any other cameras. An edge of the field of view of one camera unit can be partly overlapped with an edge of the field of view of the adjacent camera unit. Conventional image stitching technology can set some marking features in an overlapped region of the monitoring images, and the marking features in the overlapped region can be used to stitch small-range images for generating the large-range image. The marking feature has a special identification pattern, so that the monitoring camera can determine the stitching direction and stitching sequence of the monitoring images via the identification pattern. A drawback of the conventional image stitching technology is a limited installation height of the camera unit. If the camera unit is disposed on a location higher than an allowable height, the camera unit cannot identify whether the marking features in the plurality of monitoring images have the same identification pattern. Design of an image stitching method of using the marking feature without the identification pattern and increasing its detectable distance is an important issue in the monitoring industry.

SUMMARY OF THE INVENTION

The present invention provides an image stitching method utilizing a feature without an identification pattern to increase a detecting distance and systemic adaptability and a related monitoring camera apparatus for solving above drawbacks.

According to the claimed invention, an image stitching method is applied to a monitoring camera apparatus with a first image receiver and a second image receiver for respectively acquiring a first image and a second image. The image stitching method includes detecting a plurality of first features in the first image and a plurality of second features in the second image, dividing the plurality of first features at least into a first group and a second group and further dividing the plurality of second features at least into a third group, analyzing the plurality of first features and the plurality of second features via an identification condition to determine whether one of the first group and the second group is matched with the third group, and utilizing two matched groups to stitch the first image and the second image.

According to the claimed invention, a monitoring camera apparatus with an image stitching function includes a first image receiver, a second image receiver and an operational processor. The first image receiver is adapted to acquire a first image. The second image receiver is adapted to acquire a second image. The operational processor is electrically connected to the first image receiver and the second image receiver. The operational processor is adapted to detect a plurality of first features in the first image and a plurality of second features in the second image, divide the plurality of first features at least into a first group and a second group and further dividing the plurality of second features at least into a third group, analyze the plurality of first features and the plurality of second features via an identification condition to determine whether one of the first group and the second group is matched with the third group, and utilize two matched groups to stitch the first image and the second image.

The first feature and the second feature used in the image stitching method of the present invention do not have special identification pattern, so that the image stitching method and the related monitoring camera apparatus can increase its detectable distance and detectable range. The image can be stitched with one image or a plurality of images, and the features detected in the image can be used for stitching with one image or be divided for stitching several images. Thus, the image stitching method of the present invention can divide the features in each image into one or more groups, and then match the groups between different images for finding out the groups that are useful in image stitching. After the group matching, the image stitching method can pair the features between the matched groups and compute the related transformation parameter via the paired features. The images can be stitched via the paired features and the transformation parameter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
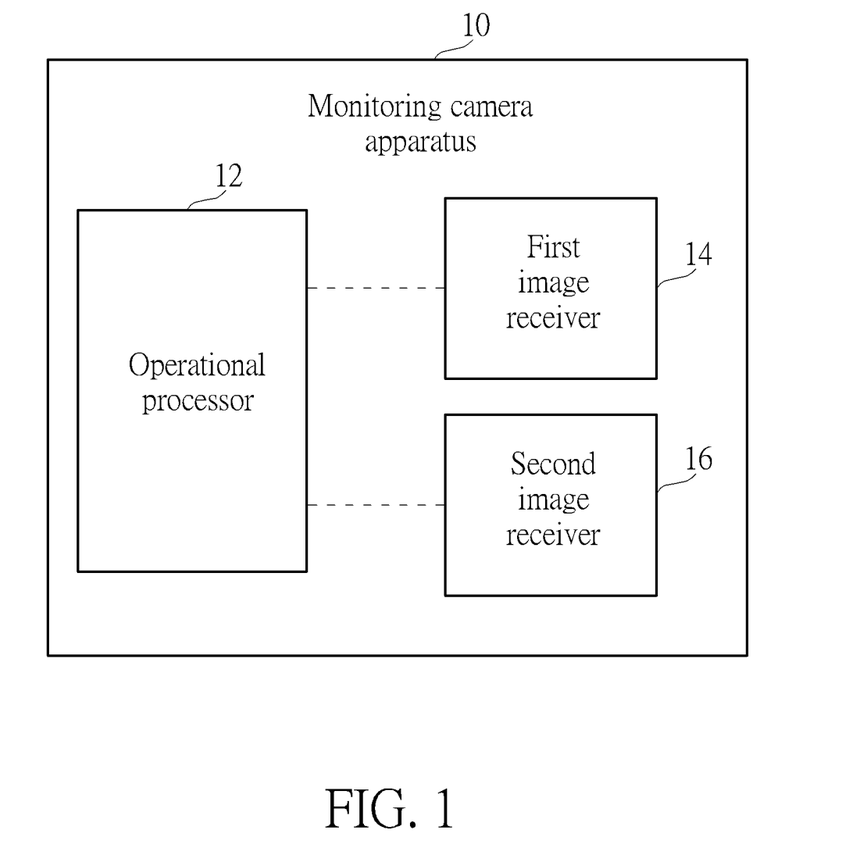
FIG. 1 is a functional block diagram of a monitoring camera apparatus according to an embodiment of the present invention.
Figure 2:
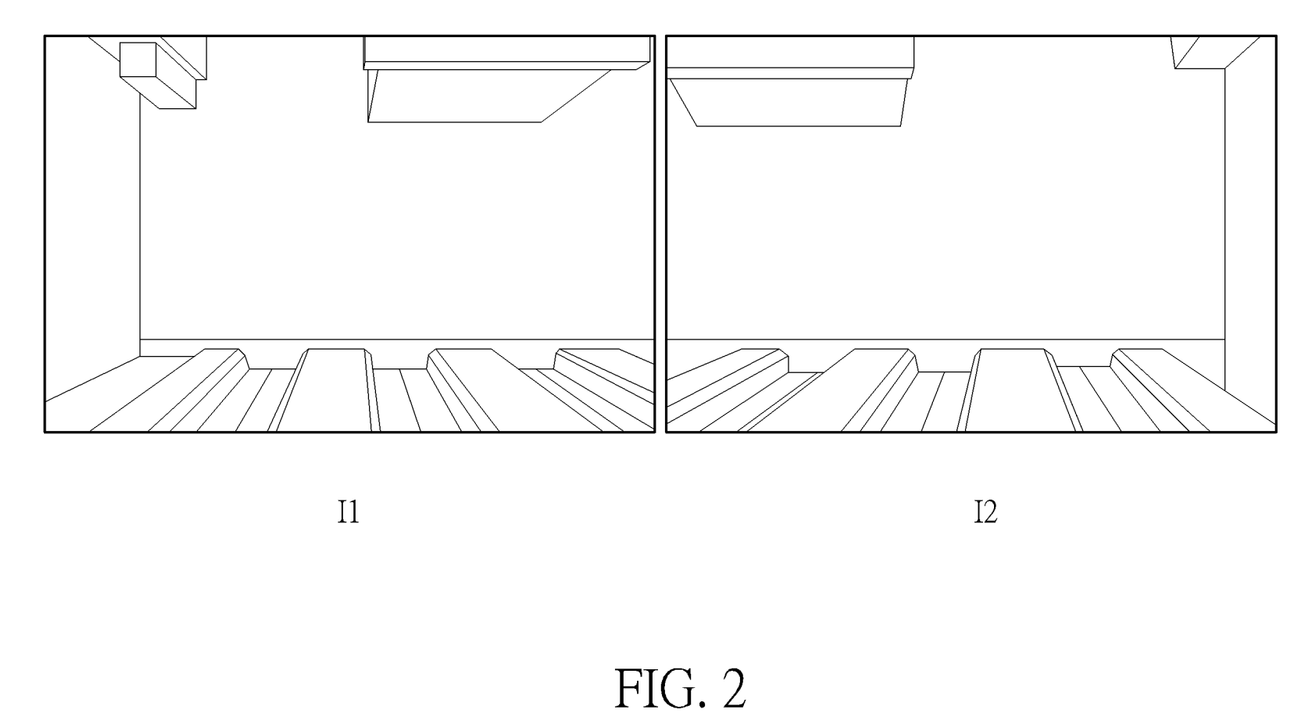
FIG. 2 is a diagram of images acquired by the monitoring camera apparatus according to the embodiment of the present invention.

Please refer to FIG. 1 and FIG. 2. FIG. 1 is a functional block diagram of a monitoring camera apparatus 10 according to an embodiment of the present invention. FIG. 2 is a diagram of images acquired by the monitoring camera apparatus 10 according to the embodiment of the present invention. The monitoring camera apparatus 10 can include some image receivers and an operational processor 12; the present invention gives an example of a first image receiver 14 and a second image receiver 16, and an actual application is not limited to the foresaid application. The monitoring camera apparatus 10 may have three or more image receivers. A field of view of the first image receiver 14 is partly overlapped with a field of view of the second image receiver 16. The first image receiver 14 and the second image receiver 16 can respectively acquire a first image I1 and a second image I2. The operational processor 12 can be electrically connected with the first image receiver 14 and the second image receiver 16 in a wire manner or in a wireless manner. The operational processor 12 can execute an image stitching method of the present invention to stitch the first image I1 and the second image I2. The operational processor 12 can be a built-in unit of the monitoring camera apparatus 10 or an external unit, which depends on actual demand.

Figure 3:
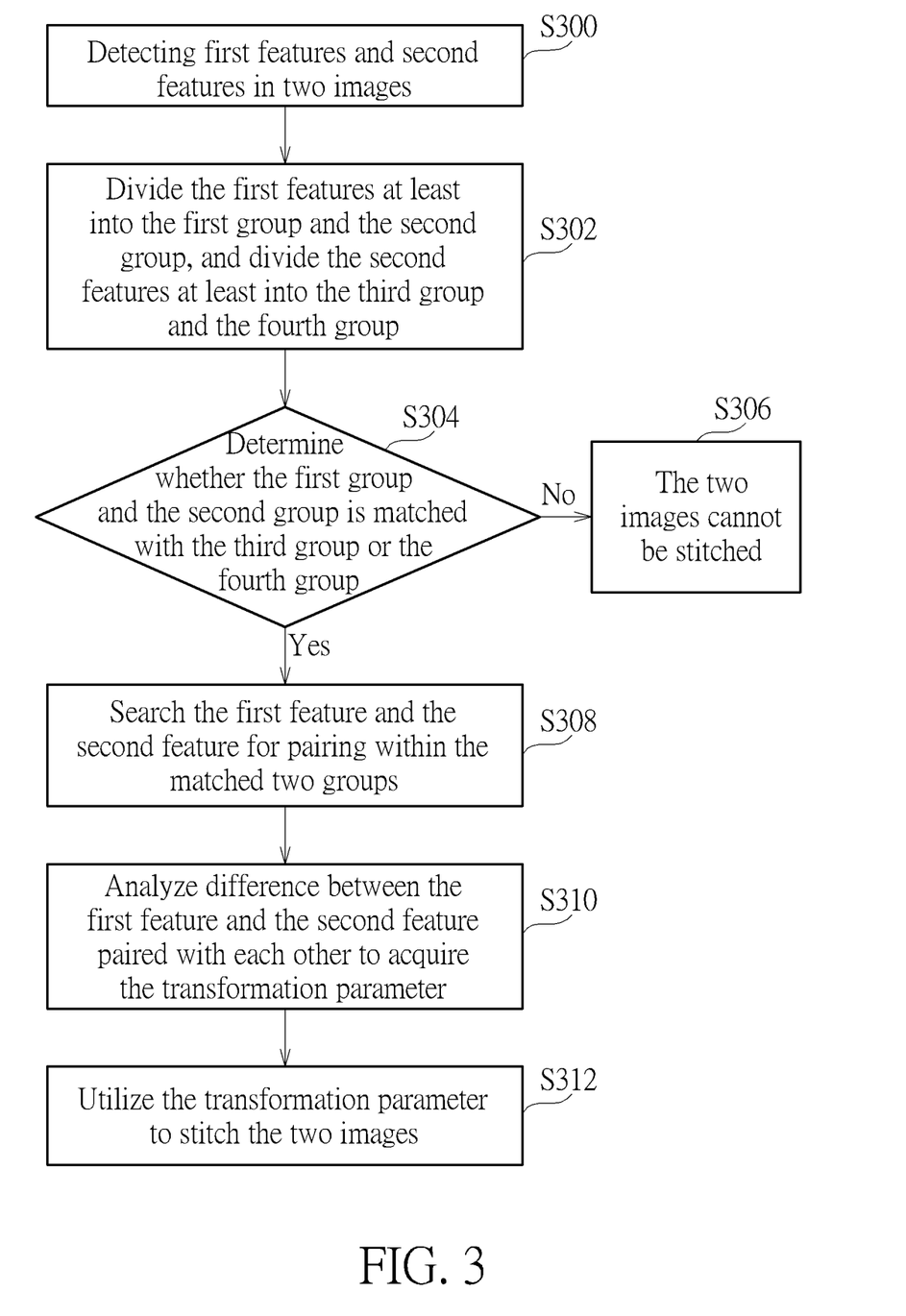
FIG. 3 is a flow chart of the image stitching method according to the embodiment of the present invention.
Figure 4:
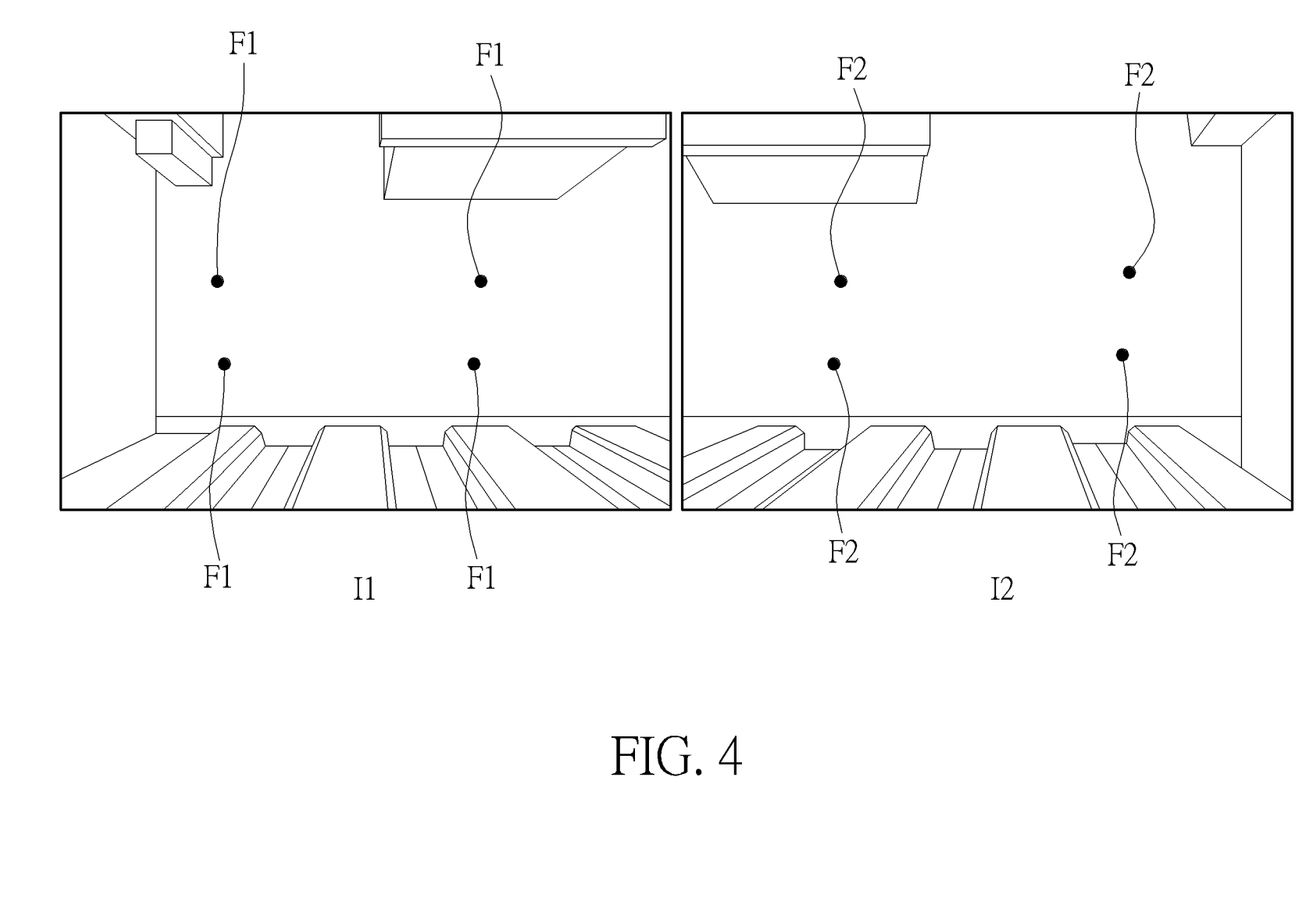
FIG. 4 to FIG. 8 are diagrams of image stitching recording according to the embodiment of the present invention.

Please refer to FIG. 1 to FIG. 8. FIG. 3 is a flow chart of the image stitching method according to the embodiment of the present invention. FIG. 4 to FIG. 8 are diagrams of image stitching recording according to the embodiment of the present invention. The image stitching method illustrated in FIG. 3 can be suitable for the monitoring camera apparatus 10 shown in FIG. 1. For the image stitching method, step S300 can be executed to transform the first image I1 and the second image I2 into binary forms for detecting a plurality of first features F1 in the binary first image I1 and a plurality of second features F2 in the binary second image I2, as shown in FIG. 4. Generally, the first feature F1 and the second feature F2 are human-made features, and can be a three-dimensional object with a specific shape or a two-dimensional printed pattern with a specific appearance, which depend on a design demand. If the first image I1 and the second image I2 are arranged horizontally, the first feature F1 and the second feature F2 can be mainly disposed on a right side and a left side of each image. If the first image I1 and the second image I2 are arranged vertically, the first feature F1 and the second feature F2 can be disposed on an upper side and a lower side of each image. An application about the images arranged side-by-side in a horizontal direction is illustrated as following.

The first feature F1 and the second feature F2 can be the geometric pattern with any shapes, such as a circular form, or a polygon form similar to a triangular form or a rectangle form. The image stitching method may detect the fully geometric pattern for identification. Besides, the first feature F1 and the second feature F2 can be the specific pattern defined by a user, such as an animal pattern, or an object pattern similar to a vehicle or a building. The image stitching method may detect the fully specific pattern for identification; the image stitching method further may detect a partial region of the specific pattern, such as a face of the animal pattern or a top or a bottom of the object pattern, for identification.

Then, step S302 can be executed to divide the plurality of first features F1 and the plurality of second features F2 into several groups. As an example of the first image I1, the image stitching method may choose one of the plurality of first features F1, such as a first feature F1a shown in FIG. 5, and then compute an interval D1 between the first feature F1a and a first feature F1b, an interval D2 between the first feature F1a and a first feature F1c, and an interval D3 between the first feature F1a and a first feature F1d. The image stitching method can set or acquire the threshold from a memory (not shown in the figures) of the monitoring camera apparatus 10. The intervals D1, D2 and D3 can be respectively compared with the threshold. The threshold is used to classify the plurality of features into different groups, and can be manually set by the user or automatically set by a system. The threshold can be set according to a dimension of the image or the interval between the features. For example, the minimal interval D1 can be selected from the intervals D1, D2 and D3. The minimal interval D1 can be weighted to define as the threshold, so that the threshold can be dynamically decided according to the minimal interval between any two features in the images for conforming to an automatic design trend. A weighting value mentioned above can be, but not limited to, greater than 1.0. According to foresaid embodiment, the threshold may not be preset by the user, and the monitoring camera apparatus 10 can automatically generate the threshold, which conforms to an actual situation, in accordance with the detected interval between the features when the weighting value is set; the above-mentioned design can provide preferred tolerance and convenience for disposing the features, and better advance operation of the image stitching method.

Figure 5:
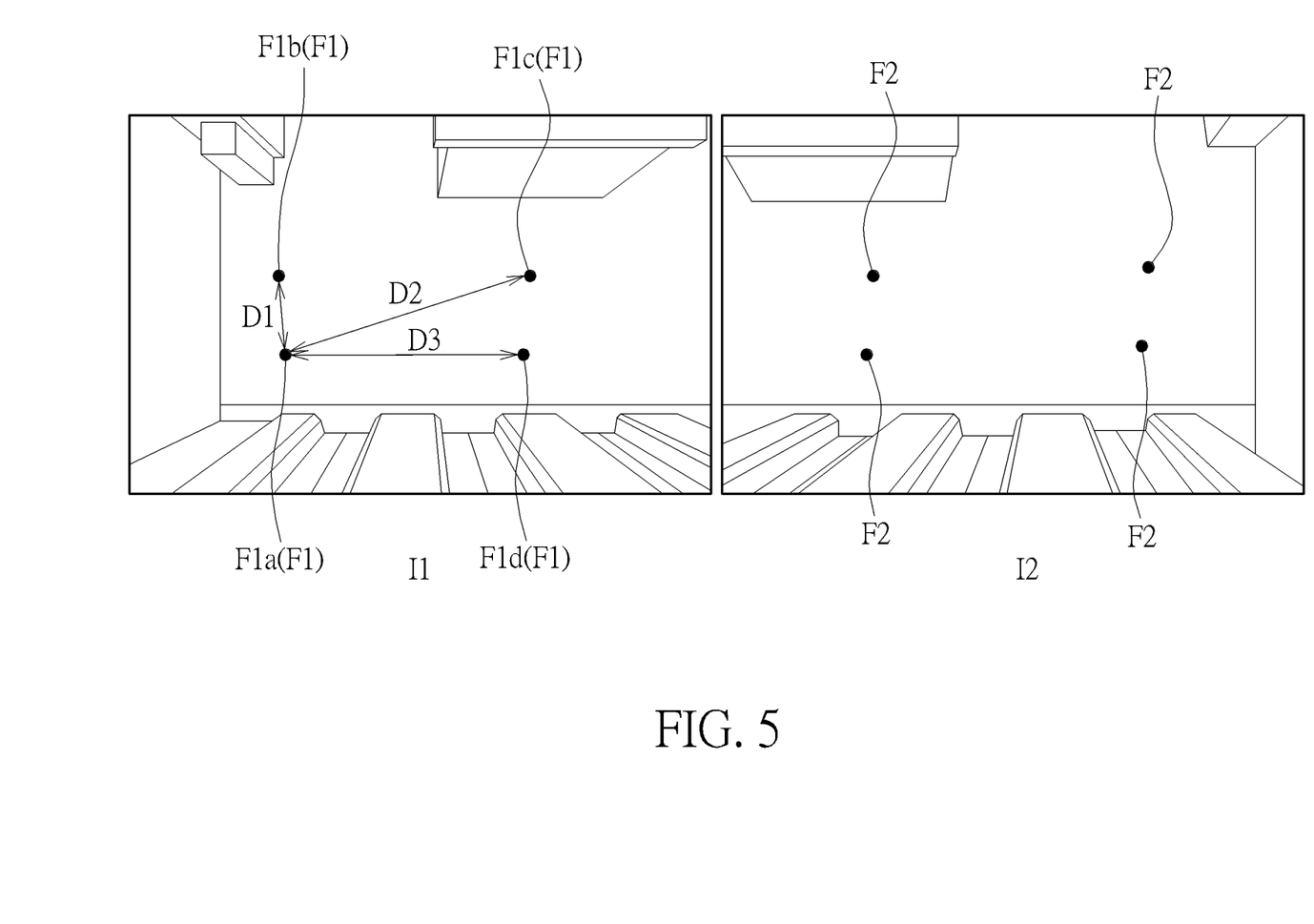

The minimal interval D1 not only can be a base of the threshold, but also can be a counting unit of the intervals D2 and D3. For example, if the interval D1 between the first feature F1a and the first feature F1b is defined as one unit length, the interval D2 between the first feature F1a and the first feature F1c may be represented as four times the interval D1 (which means four unit lengths), and the interval D3 between the first feature F1a and the first feature F1d may be represented as five times the interval D1 (which means five unit lengths). A ratio about the unit length of the intervals D2 and D3 to the interval D1 depends on the actual demand.

Figure 6:
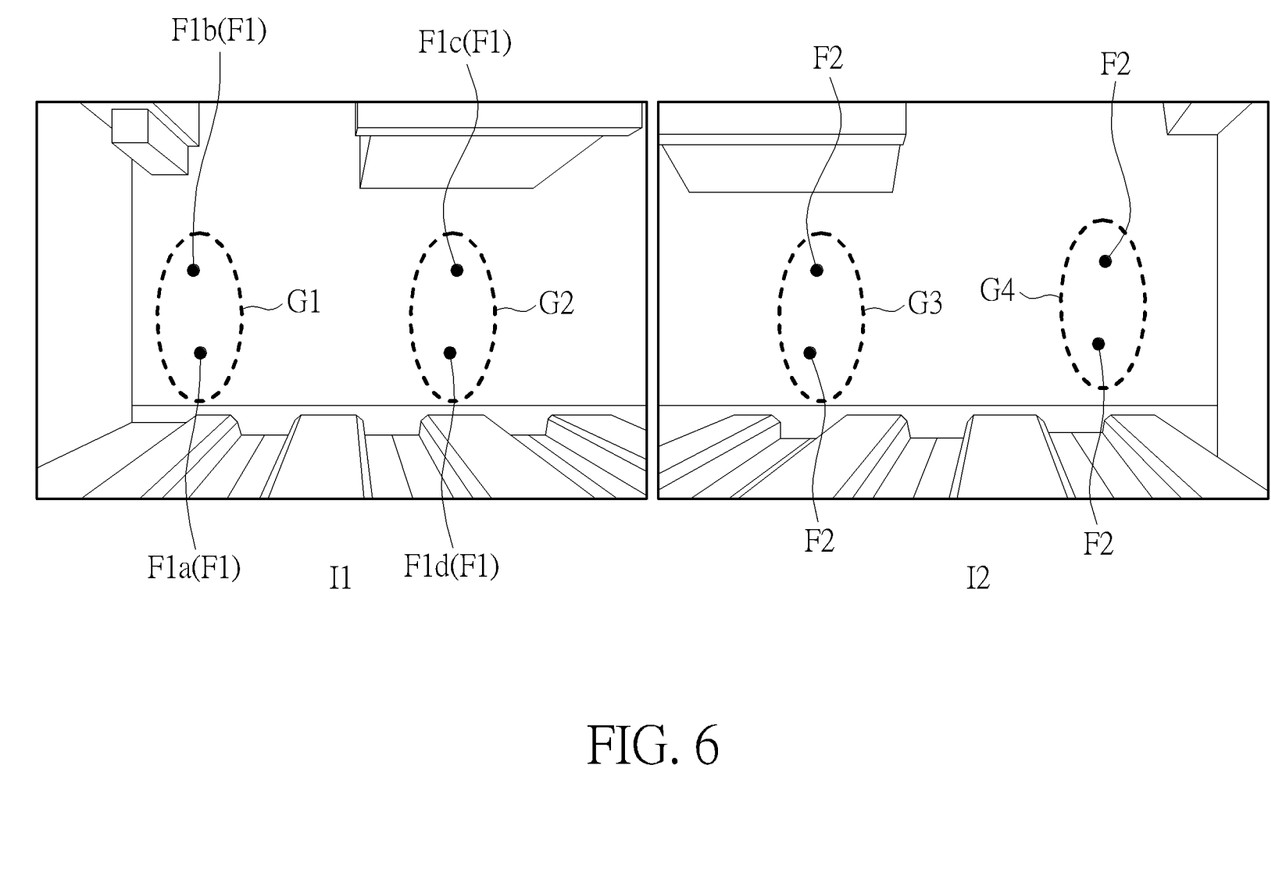

In step S302, the first feature F1a may be defined as belonging to the first group G1, and the intervals D1, D2 and D3 can be respectively compared with the threshold. If the interval D1 is smaller than or equal to the threshold, the first feature F1b can belong to the first group G1 with the first feature F1a; if the intervals D2 and D3 are greater than the threshold, the first features F1c and F1d can be different from the first feature F1a and belong to the second group G2 (another group opposite to the first group G1), as shown in FIG. 6. In the embodiment, a right side and a left side of the first image I1 can be respectively stitched with the second image I2 and another image (not shown in the figures), so that the first features F1 can be divided into at least two groups. If three side of the first image I1 are respectively stitched with three images, the first features F1 can be divided into three or more groups. The second features F2 can be divided at least into a third group G3 and a fourth group G4, which is similar to a dividing method about the first features F1, and a detailed description is omitted herein for simplicity.

In the embodiment shown in FIG. 6, if the first feature F1a is defined as belonging to the second group G2, the first feature F1b having the interval D1 smaller than or equal to the threshold can belong to the second group G2 with the first feature F1a. The first features F1c and F1d have the intervals D2 and D3 greater than the threshold, and can be different from the first feature F1a and belong to the first group G1. A serial number of the group whereto the features belong may follow in proper order or be decided by the user, which depends to an applicable demand.

As an example of the first image I1, group dividing is used to classify some first features F1 (such as the first features in the second group G2) matched with the second image I2 and other first features F1 (such as the first features in the first group G1) matched with another image for stitching, so that the first group G1 and the second group G2 of the first image I1 can respectively located at different regions in the first image I1. The different regions may be the right side and the left side, or the upper side and the lower side of the first image I1, which depend on a source and an aim of the stitching image. The third group G3 and the fourth group G4 are respectively located at different regions in the second image I2, and used to match with the first image I1 and another image (not shown in the figures) for stitching.

Then, step S304 can be executed to analyze the plurality of first features F1 and the plurality of second features F2 via an identification condition for determining whether one of the first group G1 and the second group G2 can be matched with the third group G3 or the fourth group G4. The identification condition can be selected from a group consisting of color, a dimension, a shape, an amount, an arrangement and a combination of the plurality of first features F1 and the plurality of second features F2. In an example of color features, if the first features F1a and F1b in the first group G1 are red, and the first features F1c and F1d in the second group G2 are blue, and the second features F2 in the third group G3 are blue, and the second features F2 in the fourth group G4 are yellow, the image stitching method can rapidly determine that the second group G2 is matched with the third group G3 via analysis of the color features.

In an example of dimension and shape features, if the first features F1a and F1b in the first group G1 are small circular spots, and the first features F1c and F1d in the second group G2 are middle square blocks, and the second features F2 in the third group G3 are the middle square blocks, and the second features F2 in the fourth group G4 are large triangle forms, the image stitching method can rapidly determine that the second group G2 is matched with the third group G3 via geometric analysis of the features. In an example of arrangement features, if the first features F1a and F1b in the first group G1 are vertical arrangement, and the first features F1c and F1d in the second group G2 are transverse arrangement, and the second features F2 in the third group G3 are the transverse arrangement, and the second features F2 in the fourth group G4 are oblique arrangement, the image stitching method can rapidly determine that the second group G2 is matched with the third group G3 via arrangement analysis of the features. In an example of amount features, if an amount of the first features F1 in the second group G2 is identical with an amount of the second features F2 in the third group G3, but different from an amount of the second features F2 in the fourth group G4, the image stitching method can determine the second group G2 is matched with the third group G3.

It should be mentioned that even though the plurality of features conforms to the same arrangement, intervals between the plurality of features still can be used to determine matching of those groups. If some first features F1 and some second features F2 are the transverse arrangement, two groups may be considered as not matching because first intervals between these first features F1 are different from second intervals between these second features F2, or because a difference between the first interval and the second interval exceeds a predefined threshold.

Figure 7:
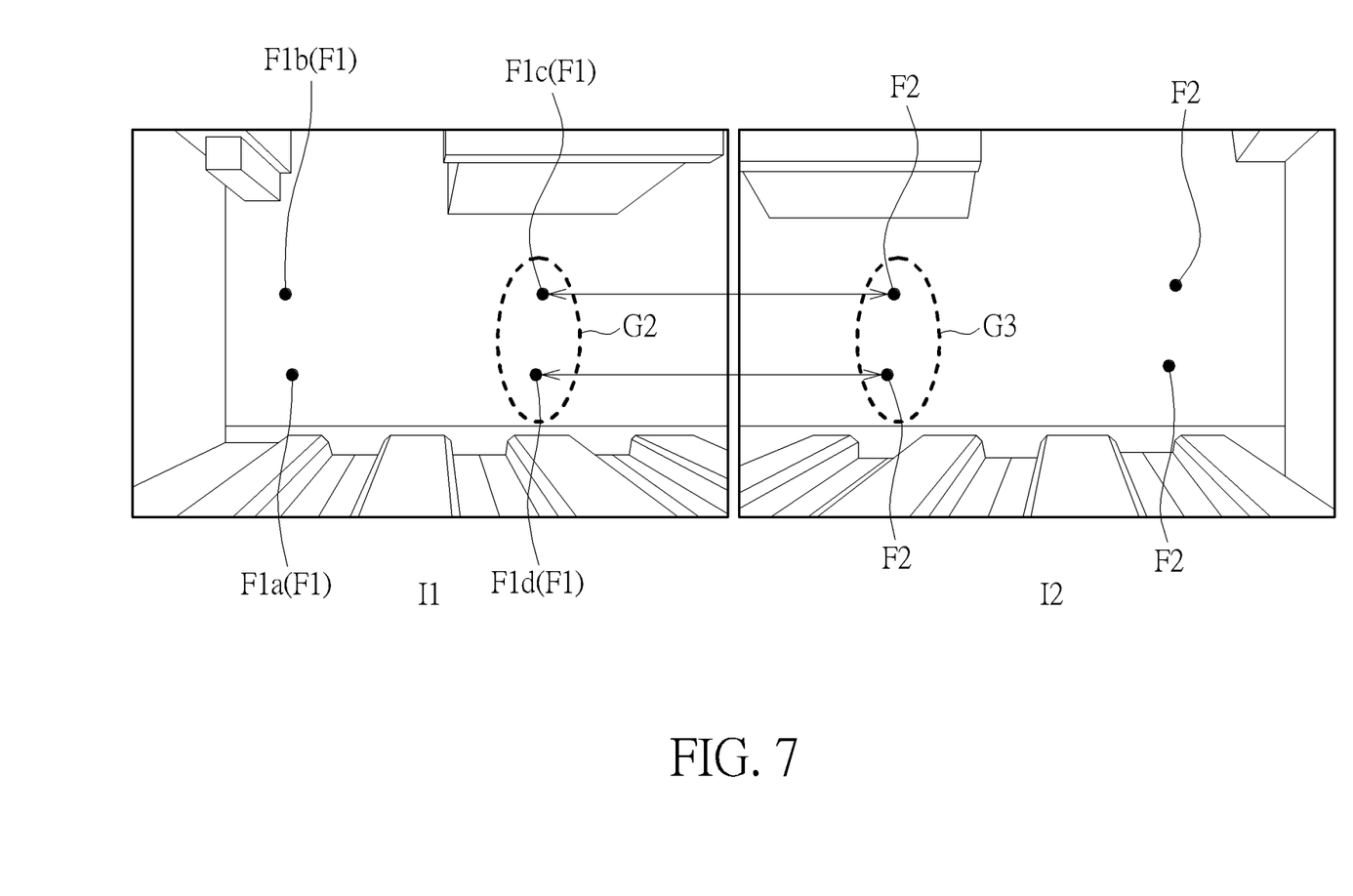

If the first group G1 and the second group G2 cannot be matched with the third group G3 or the fourth group G4, step S306 can be executed that the image stitching method determines the first image I1 is not stitched with the second image I2. If one of the first group G1 and the second group G2 can be matched with the third group G3 or the fourth group G4, such as the second group G2 being matched with the third group G3, a region of the second group G2 in the first image I1 and a region of the third group G3 in the second image I2 can belong to an overlapping region of the first image I1 and the second image I2, so that step S308 can be executed to search at least two first features F1 and at least two second features F2 within the matched groups G2 and G3 for pairing via the foresaid identification condition. As shown in FIG. 7, the first feature F1c can be paired with the second feature F2 in an upper region of the third group G3, and the first feature F1d can be paired with the second feature F2 in a lower region of the third group G3.

Figure 8:
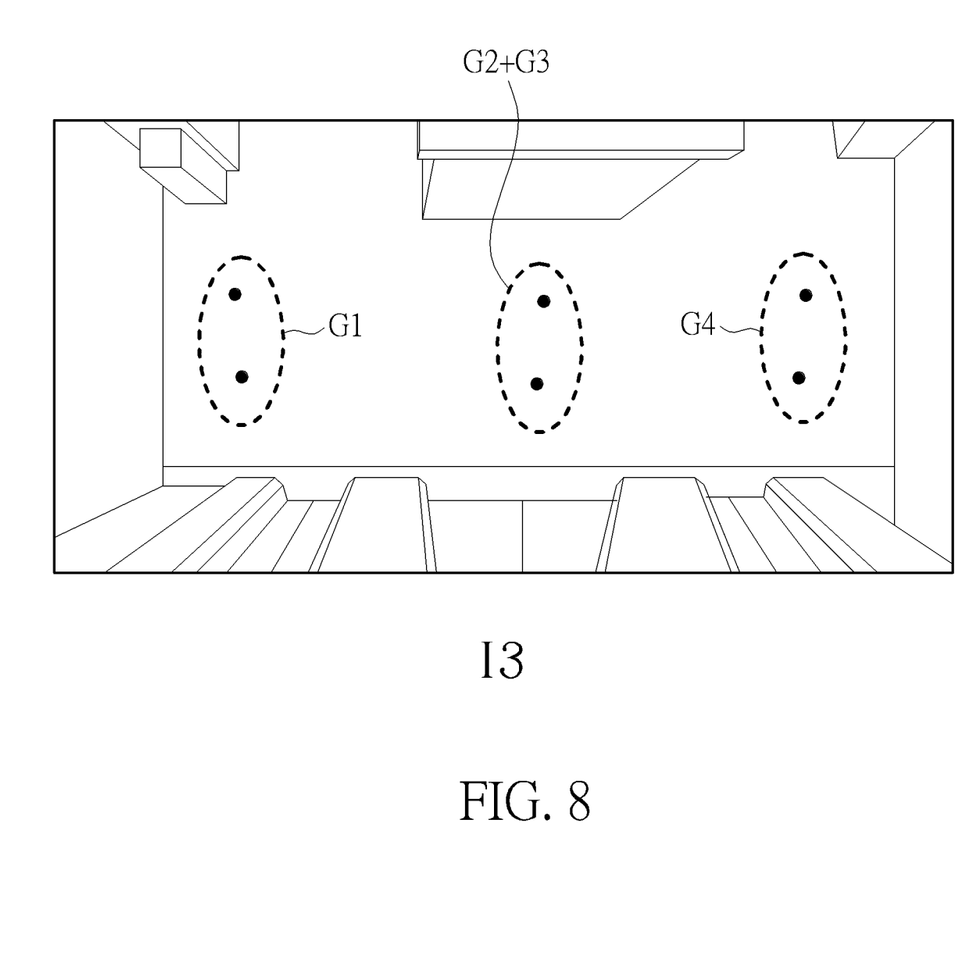

When group matching is completed, the image stitching method can search the first features F1 and the second features F2 for pairing within the matched second group G2 and the matched third group G3 according to the group consisting of the color, the dimension, the shape, the amount, the arrangement and the combination thereof. The first features F1 and the second features F2 which cannot be paired are not applied for the image stitching method. Final, steps S310 and S312 can be executed to analyze difference between the at least two first features F1 and the at least two second features F2 paired with each other for acquiring a transformation parameter, and utilize the transformation parameter to stitch the first image I1 and the second image I2 for generating a combined image I3, as shown in FIG. 8. The image stitching method can compute the transformation parameter via mean-square error (MSE) algorithm or any other mathematic model.

Figure 9:
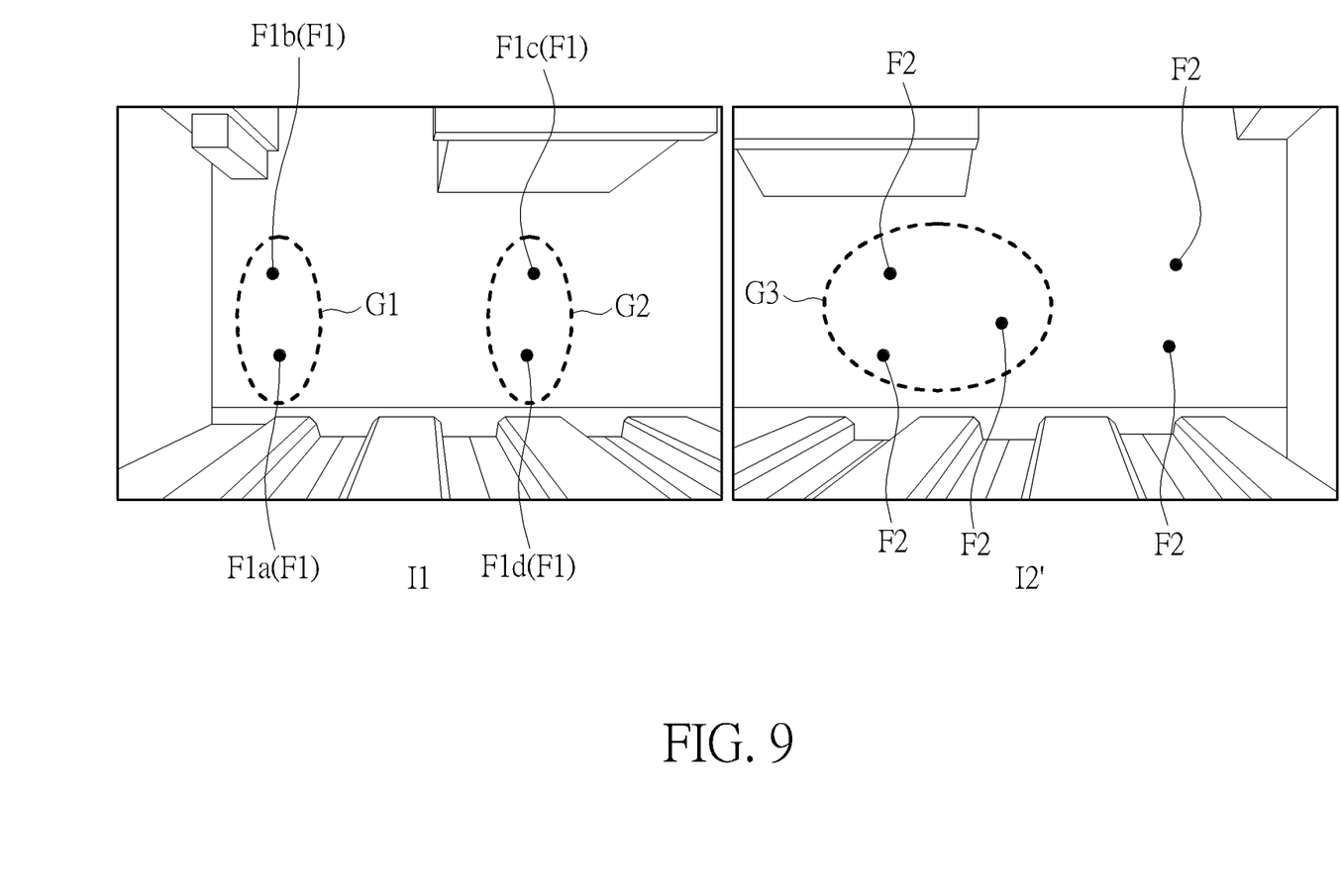
FIG. 9 is a diagram of the image stitching recording according to another embodiment of the present invention.

In the above-mentioned embodiment, when the monitoring camera apparatus 10 has three or more image receivers, the image stitching method can divide the plurality of first features F1 and the plurality of second features F2 at least into two groups, so the first image I1 and the second image I2 can be stitched with a left-side image and/or a right-side image. The image stitching method of the present invention further can be applied for a situation of one image stitched with other image only via one side. Please refer to FIG. 9. FIG. 9 is a diagram of the image stitching recording according to another embodiment of the present invention. In this embodiment, the second image receiver 16 can face the field edge of view of the monitoring camera apparatus 10 to acquire the second image I2', and step S302 in the image stitching method can be executed by setting one group on a side of the second image I2' close to the first image I1, which means the third group G3 can be set from a left cluster of the plurality of second features F2. A right side of the second image I2' is not stitched with other image, so that a left cluster of the plurality of second features F2 does not set a group.

Then, following steps can be similar to the above-mentioned embodiment. The image stitching method can determine whether the first group G1 or the second group G2 in the first image I1 is matched with the third group G3 in the second image I2'. If the first group G1 is not matched with the third group G3, the left side of the first image I1 can be stitched with another image instead of the second image I2'; if the second group G2 is matched with the third group G3, the right side of the first image I1 can be stitched with the left side of the second image I2'.

In one specific embodiment, a monitoring area of the monitoring camera apparatus 10 may have several features, and the image receiver cannot capture the image containing all the features due to an angle of view of the image receiver. As shown in FIG. 9, the right side of the first image I1 captured by the first image receiver 14 only contains two first features F1, and the left side of the second image I2 captured by the second image receiver 16 contains three second features F2. The right-side second feature F2 is distant from two left-side second features F2 in the group G2, so the field of view of the first image receiver 14 cannot contain all the three second features F2. The image stitching method can execute step S302 to divide the second features F2 in the second image I2 into two groups. The amount of the first features F1 in the second group G2 is different from the amount of the second features F2 in the third group G3, and the color, the dimension and the shape can be used as the identification condition for executing the group matching in step S304 and feature pairing in step S308; that is to say, selection of the color, the dimension, the shape, the amount and the arrangement of the feature can be varied in different procedures (such as the group matching and the feature pairing), which depends on design demand and actual application.

In conclusion, the first feature and the second feature used in the image stitching method of the present invention do not have special identification pattern, so that the image stitching method and the related monitoring camera apparatus can increase its detectable distance and detectable range. The image can be stitched with one image or a plurality of images, and the features detected in the image can be used for stitching with one image or be divided for stitching several images. Thus, the image stitching method of the present invention can divide the features in each image into one or more groups, and then match the groups between different images for finding out the groups that are useful in image stitching. After the group matching, the image stitching method can pair the features between the matched groups and compute the related transformation parameter via the paired features. The images can be stitched via the paired features and the transformation parameter. Comparing to the prior art, the image stitching method and the monitoring camera apparatus of the present invention executes the group matching firstably, and then executes the feature pairing in accordance with a result of the group matching, so as to effectively increase diversity of the features, and further to provide preferred stitching speed and accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image stitching method applied to a monitoring camera apparatus with a first image receiver and a second image receiver for respectively acquiring a first image and a second image, the image stitching method comprising:
    detecting a plurality of first features in the first image and a plurality of second features in the second image;
    dividing the plurality of first features at least into a first group and a second group in accordance with intervals between the plurality of first features and further dividing the plurality of second features at least into a third group in accordance with intervals between the plurality of second features;
    analyzing the plurality of first features and the plurality of second features via an identification condition to determine whether one of the first group and the second group is matched with the third group; and
    utilizing two matched groups to stitch the first image and the second image;
    wherein the plurality of first features and the plurality of second features are human-made patterns respectively located inside the first image and the second image;
    wherein the identification condition is selected from a group consisting of color, a dimension, a shape, an amount, an arrangement and a combination of the plurality of first features and the plurality of second features.

2. The image stitching method of claim 1, wherein dividing the plurality of first features at least into the first group and the second group comprises:
    computing several intervals between one first feature and other first features of the plurality of first features;
    comparing the intervals with a threshold; and
    determining whether each of the plurality of first feature belongs to the first group or the second group according to a comparison result.

3. The image stitching method of claim 2, further comprising:
    setting the threshold dynamically based on a minimal interval of the intervals.

4. The image stitching method of claim 2, wherein when one first feature belongs to the first group, some first features having the interval smaller than or equal to the threshold belong to the first group, and some first features having the interval greater than the threshold belong to the second group.

5. The image stitching method of claim 1, wherein utilizing the two matched groups to stitch the first image and the second image comprises:
    searching at least two first features and at least two second features for pairing within the two matched groups via the identification condition;
    analyzing difference between the at least two first features and the at least two second features to acquire a transformation parameter; and
    utilizing the transformation parameter to stitch the first image and the second image.

6. The image stitching method of claim 5, wherein the image stitching method determines whether the first group or the second group is matched with the third group, and then pairs the first features and the second features of the two matched groups via the identification condition.

7. The image stitching method of claim 1, wherein the first group and the second group are respectively located at different regions inside the first image.

8. The image stitching method of claim 1, wherein when the second group is matched with the third group, a region about the second group in the first image and a region of the third group in the second image are an overlapping region of the first image and the second image.

9. The image stitching method of claim 8, wherein the image stitching method utilizes one group of the first group and the second group matched with the third group to stitch the first image and the second image, and further utilizes another group of the first group and the second group to stitch the first image and another image.

10. The image stitching method of claim 1, wherein the first feature and/or the second feature is a geometric symbol or a specific pattern.

11. A monitoring camera apparatus with an image stitching function, comprising:
    a first image receiver adapted to acquire a first image;
    a second image receiver adapted to acquire a second image; and
    an operational processor electrically connected to the first image receiver and the second image receiver, the operational processor being adapted to detect a plurality of first features in the first image and a plurality of second features in the second image, divide the plurality of first features at least into a first group and a second group in accordance with intervals between the plurality of first features and further dividing the plurality of second features at least into a third group in accordance with intervals between the plurality of second features, analyze the plurality of first features and the plurality of second features via an identification condition to determine whether one of the first group and the second group is matched with the third group, and utilize two matched groups to stitch the first image and the second image;

wherein the plurality of first features and the plurality of second features are human-made patterns respectively located inside the first image and the second image;

wherein the identification condition is selected from a group consisting of color, a dimension, a shape, an amount, an arrangement and a combination of the plurality of first features and the plurality of second features.

12. The monitoring camera apparatus of claim 11, wherein the operational processor is further adapted to compute several intervals between one first feature and other first features of the plurality of first features, compare the intervals with a threshold, and determine whether each of the plurality of first feature belongs to the first group or the second group according to a comparison result.

13. The monitoring camera apparatus of claim 12, wherein the operational processor is further adapted to set the threshold dynamically based on a minimal interval of the intervals.

14. The monitoring camera apparatus of claim 12, wherein when one first feature belongs to the first group, some first features having the interval smaller than or equal to the threshold belong to the first group, and some first features having the interval greater than the threshold belong to the second group.

15. The monitoring camera apparatus of claim 11, wherein the operational processor is further adapted to search at least two first features and at least two second features for pairing within the two matched groups via the identification condition, analyze difference between the at least two first features and the at least two second features to acquire a transformation parameter, and utilize the transformation parameter to stitch the first image and the second image.

16. The monitoring camera apparatus of claim 15, wherein the operational processor determines whether the first group or the second group is matched with the third group, and then pairs the first features and the second features of the two matched groups via the identification condition.

17. The monitoring camera apparatus of claim 11, wherein the first group and the second group are respectively located at different regions inside the first image.

18. The monitoring camera apparatus of claim 11, wherein when the second group is matched with the third group, a region about the second group in the first image and a region of the third group in the second image are an overlapping region of the first image and the second image.

19. The monitoring camera apparatus of claim 18, wherein the operational processor utilizes one group of the first group and the second group matched with the third group to stitch the first image and the second image, and further utilizes another group of the first group and the second group to stitch the first image and another image.

* * * * *